(12) United States Patent
Song et al.

(10) Patent No.: US 12,019,529 B2
(45) Date of Patent: Jun. 25, 2024

(54) TESTING METHOD AND TESTING DEVICE

(71) Applicants: China Mobile Communication Co., Ltd Research Institute, Beijing (CN); China Mobile Communications Group Co., Ltd., Beijing (CN)

(72) Inventors: Dan Song, Beijing (CN); Luting Kong, Beijing (CN); Nan Li, Beijing (CN); Songhe Lu, Beijing (CN); Xiaoxiong Song, Beijing (CN); Jun Liu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 18/006,768

(22) PCT Filed: Jul. 30, 2021

(86) PCT No.: PCT/CN2021/109851
§ 371 (c)(1),
(2) Date: Jan. 25, 2023

(87) PCT Pub. No.: WO2022/022717
PCT Pub. Date: Feb. 3, 2022

(65) Prior Publication Data
US 2023/0259432 A1   Aug. 17, 2023

(30) Foreign Application Priority Data

Jul. 31, 2020 (CN) .......................... 202010757937.9

(51) Int. Cl.
*G06F 11/22* (2006.01)
*G06F 11/34* (2006.01)

(52) U.S. Cl.
CPC ...... *G06F 11/2289* (2013.01); *G06F 11/2273* (2013.01); *G06F 11/3409* (2013.01)

(58) Field of Classification Search
CPC ............. G06F 11/2289; G06F 11/2273; G06F 11/3409
See application file for complete search history.

(56) References Cited

U.S. PATENT DOCUMENTS

| 7,895,565 B1 | 2/2011 | Hudgons et al. |
| 10,387,295 B1 | 8/2019 | Kesarwani |

(Continued)

FOREIGN PATENT DOCUMENTS

| CA | 2631788 A1 | 11/2008 |
| CN | 101536593 A | 9/2009 |

(Continued)

*Primary Examiner* — Jigar P Patel
(74) *Attorney, Agent, or Firm* — Price Heneveld LLP

(57) ABSTRACT

The present disclosure provides a testing method and a testing device. The testing method includes: configuring one or more testing parameters for a to-be-tested object, and performing at least two testing processes to obtain a testing value of each performance index for each testing process, each of the at least two testing processes being used to test different performance index of the to-be-tested object or to test different performance indices of the to-be-tested object; and generating a testing result of the to-be-tested object in accordance with the testing value of each performance index for each testing process. According to the present disclosure, it is able to perform the multi-dimensional test, thereby to meet the requirement on the performance indices in different scenarios, improve the testing efficiency, and increase the reliability of the testing result for true performance of a terminal.

20 Claims, 9 Drawing Sheets

(56) References Cited

U.S. PATENT DOCUMENTS

| | | | |
|---|---|---|---|
| 10,474,564 B1* | 11/2019 | Konyshev | G06F 11/3688 |
| 10,496,532 B1* | 12/2019 | Kaitha | G06F 11/3419 |
| 11,392,486 B1* | 7/2022 | Vadaparty | G06F 11/3688 |
| 2007/0174709 A1* | 7/2007 | Sluiman | G06F 11/28 |
| | | | 714/E11.178 |
| 2008/0010523 A1 | 1/2008 | Mukherjee | |
| 2010/0099433 A1 | 4/2010 | Wigren | |
| 2012/0053894 A1 | 3/2012 | Macik et al. | |
| 2016/0004628 A1* | 1/2016 | Gugri | G06F 11/3688 |
| | | | 717/124 |
| 2017/0091079 A1 | 3/2017 | Zhou | |
| 2018/0225194 A1* | 8/2018 | Saleh-Esa | G06Q 10/06311 |

FOREIGN PATENT DOCUMENTS

| | | |
|---|---|---|
| CN | 102821211 A | 12/2012 |
| CN | 107992401 A | 5/2018 |
| CN | 108572918 A | 9/2018 |
| CN | 112511367 A | 3/2021 |
| JP | 2009212616 A | 9/2009 |

* cited by examiner

TESTING METHOD AND TESTING DEVICE

CROSS-REFERENCE TO RELATED APPLICATION

This application is the U.S. national phase of PCT Application No. PCT/CN2021/109851 filed on Jul. 30, 2021, which claims a priority of the Chinese patent application No. 202010757937.9 filed on Jul. 31, 2020, which are incorporated herein by reference in their entireties.

TECHNICAL FIELD

The present disclosure relates to the field of device testing technology, in particular to a testing method and a testing device.

BACKGROUND

In most of conventional testing methods, a single-input-single-output testing mode is adopted. FIG. 1 shows a conventional "single input-single output" testing system, and when a testing output quantity 1 is inputted, whether a test passes is determined in accordance with a testing input quantity 1. Generally speaking, a determination basis for the single-input-single-output is a fixed threshold, and whether the test is passed or failed is determined in accordance with whether a testing result is smaller than or greater than the fixed threshold. For example, the test includes a voltage test, a resistance test, etc.

FIG. 2 shows a conventional multi-input-single-output testing system, in which a plurality of input quantities, e.g., testing input quantity 1, testing input quantity 2, . . . , and testing input quantity M, are inputted, and a testing output quantity 1 is outputted, i.e., multi-input-single-output. Generally speaking, a determination basis for the multi-input-single-output testing method is a fixed threshold, and whether the test is passed or failed is determined in accordance with whether a testing result is smaller than or greater than the fixed threshold. For example, for a power consumption test, such testing input quantities as voltage, Discontinuous Reception (DRX) configuration and temperature are inputted, and a testing result, i.e., a testing output quantity, is a predetermined value. When the testing result is greater than the predetermined value, it means that the test is failed, and when the testing result is smaller than the predetermined value, it means that the test is passed.

FIG. 3 shows an instance of a conventional testing process, where T represents transmission and R represents reception. In an instrument testing process, a testing result is obtained finally through transmitting data to a to-be-tested terminal multiple times and measuring and receiving relevant data about the to-be-tested terminal multiple times (in FIG. 3, the data is transmitted twice, i.e., T1 and T2, and the relevant data is received twice, i.e., R1 and R2).

However, for vertical industry testing scenario, usually it is insufficient to describe a testing result on a single dimension. In a typical vertical industry scenario, usually the testing result needs to be described and evaluated using variables on multiple dimensions, so a multi-dimensional evaluation method needs to be introduced. Currently, there is no multi-dimensional testing system or method in the related art.

SUMMARY

An object of the present disclosure is to provide a testing method and a testing device, so as to achieve the multi-dimensional test.

In one aspect, the present disclosure provides in some embodiments a testing method, including: configuring one or more testing parameters for a to-be-tested object, and performing at least two testing processes to obtain a testing value of each performance index for each testing process, each of the at least two testing processes being used to test different performance index of the to-be-tested object or to test different performance indices of the to-be-tested object; and generating a testing result of the to-be-tested object in accordance with the testing value of each performance index for each testing process.

In a possible embodiment of the present disclosure, the configuring the one or more testing parameters for the to-be-tested object and performing at least two testing processes to obtain the testing value of each performance index for each testing process includes performing test for at least one round, and in each round, the one or more testing parameters are configured for the to-be-tested object and a performance index threshold is set.

In a possible embodiment of the present disclosure, the at least two testing processes are performed sequentially or in parallel in each round.

In a possible embodiment of the present disclosure, when the at least two testing processes are performed sequentially in each round, the testing processes are performed sequentially in accordance with a predetermined order of the testing processes. The performing a current testing process includes: configuring a first testing parameter for the to-be-tested object, setting a first performance index threshold, and in the case that a second performance index meets a second performance index threshold, performing the current testing process to obtain a testing value of a first performance index for the current testing process; and determining whether the current testing process passes the test in accordance with the testing value of the first performance index and the first performance index threshold.

In a possible embodiment of the present disclosure, when the current testing process is a first testing process in a current round, a value of the first testing parameter is an initial value or a value adjusted in accordance with a testing result of a previous round; and when the current testing process is not the first testing process in the current round, the first testing parameter is provided with a value so that the second performance index meets the second performance index threshold after a previous testing process is terminated, and the second performance index is a set of performance indices for all the testing processes before the current testing process in the current round.

In a possible embodiment of the present disclosure, the testing method further includes: when the current testing process fails to pass the test, terminating the test in the current round; when the current testing process passes the test and the current testing process is a last testing process in the current round, terminating the test in the current round; and when the current testing process passes the test and the current testing process is not the last testing process in the current round, performing the test in a next testing process of the current testing process.

In a possible embodiment of the present disclosure, the generating the testing result of the to-be-tested object in accordance with the testing value of each performance index for each testing process includes: when the test in the current round is terminated and all the testing processes pass the test, determining that the test in the current round is passed; and when the test in the current round is terminated and there are one or more testing processes which fail to pass the test, determining that the test in the current round is failed.

In a possible embodiment of the present disclosure, the generating the testing result of the to-be-tested object in accordance with the testing value of each performance index for each testing process further includes: when the test in the current round is terminated and all the testing processes pass the test, outputting the testing result indicating that the to-be-tested object has passed the test; and when the test in the current round is terminated and there are one or more testing processes which fail to pass the test, outputting the testing result indicating that the to-be-tested object fails to pass the test.

In addition, the generating the testing result of the to-be-tested object in accordance with the testing value of each performance index for each testing process further includes, when the test in the current round is terminated, outputting the testing value of each performance index obtained in the current round.

In a possible embodiment of the present disclosure, when the at least two testing processes are performed in parallel in each round, the performing a current testing process includes: configuring a second testing parameter for the to-be-tested object, setting a performance index threshold corresponding to each testing process, and performing the at least two testing processes in parallel so as to obtain the testing value of the performance index for each testing process, a value of the second testing parameter being an initial value or a value adjusted after the test in the previous round is terminated; and determining whether each testing process passes the test in accordance with the testing value of the performance index obtained in each testing process and the performance index threshold.

In a possible embodiment of the present disclosure, the generating the testing result of the to-be-tested object in accordance with the testing value of the performance index for each testing process includes: terminating the test in the current round when any testing process in the current round fails to pass the test; and terminating the test in the current round when all the testing processes in the current round pass the test.

In a possible embodiment of the present disclosure, the generating the testing result of the to-be-tested object in accordance with the testing value of the performance index for each testing process includes: when the test in the current round is terminated and all the testing processes pass the test, determining that the test in the current round is passed; and when the test in the current round is terminated and there are one or more testing processes which fail to pass the test, determining that the test in the current round fails to be passed.

In a possible embodiment of the present disclosure, the generating the testing result of the to-be-tested object in accordance with the testing value of the performance index for each testing process further includes outputting the testing value of each performance index obtained in the current round when the test in the current round is terminated.

In a possible embodiment of the present disclosure, the at least two testing processes include a first testing process and a second testing process, and there is an association relationship between a performance index measured in the first testing process and a performance index measured in the second testing process. The association relationship includes at least one of that the performance index measured in the first testing process is positively associated with the performance index measured in the second testing process, that the performance index measured in the first testing process is negatively associated with the performance index measured in the second testing process, or the performance index measured in the first testing process and the performance index measured in the second testing process are in a mutual cause-effect relation.

In a possible embodiment of the present disclosure, the testing method further includes: determining a target performance index in a target application scenario in accordance with a first mapping relationship between an application scenario and the performance index of the to-be-tested object; determining a target testing parameter corresponding to the target performance index in accordance with a second mapping relationship between the performance index and the testing parameter of the to-be-tested object; and generating the at least two testing processes for measuring the target performance index in accordance with the target testing parameter.

In a possible embodiment of the present disclosure, the generating the testing result of the to-be-tested object in accordance with the testing value of each performance index for each testing process includes: forming a polygon with the performance index measured in each testing process as a vertex; taking a line connecting a center and each vertex of the polygon as a scale line, and marking a numerical value of a corresponding performance index on the scale line; determining a corresponding threshold point on the scale line in accordance with a performance index threshold for each performance index, and connecting the threshold points on the adjacent scale lines sequentially to generate a threshold region corresponding to the performance index threshold; determining a corresponding testing value point on the scale line in accordance with the testing value of the performance index for each testing process, and connecting the testing value points on the adjacent scale lines sequentially to generate a testing value region corresponding to the testing value of the performance index; and obtaining the testing result indicating whether the to-be-tested object has passed the test in accordance with whether the threshold region is included in the testing value region.

In a possible embodiment of the present disclosure, the obtaining the testing result indicating whether the to-be-tested object has passed the test in accordance with whether the threshold region is included in the testing value region includes, when the entire threshold region is included in the testing value region, obtaining the testing result indicating that the to-be-tested object has passed the test, otherwise obtaining the testing result indicating that the to-be-tested object fails to pass the test.

In another aspect, the present disclosure provides in some embodiments a testing device, including a transceiver and a processor. The transceiver is configured to configure one or more testing parameters for a to-be-tested object. The processor is configured to: perform at least two testing processes to obtain a testing value of each performance index for each testing process, each of the at least two testing processes being used to test different performance index of the to-be-tested object or to test different performance indices of the to-be-tested object; and generate a testing result of the to-be-tested object in accordance with the testing value of each performance index for each testing process.

In a possible embodiment of the present disclosure, the processor is further configured to perform test for at least one round, and in each round, the one or more testing parameters are configured for the to-be-tested object and a performance index threshold is set.

In a possible embodiment of the present disclosure, the processor is further configured to perform the at least two testing processes sequentially or in parallel in each round.

In a possible embodiment of the present disclosure, the processor is further configured to, when the at least two testing processes are performed sequentially in each round, perform the testing processes sequentially in accordance with a predetermined order of the testing processes. The performing a current testing process includes: configuring a first testing parameter for the to-be-tested object, setting a first performance index threshold, and in the case that a second performance index meets a second performance index threshold, performing the current testing process to obtain a testing value of a first performance index for the current testing process; and determining whether the current testing process passes the test in accordance with the testing value of the first performance index and the first performance index threshold.

In a possible embodiment of the present disclosure, when the current testing process is a first testing process in a current round, a value of the first testing parameter is an initial value or a value adjusted in accordance with a testing result of a previous round; and when the current testing process is not the first testing process in the current round, the first testing parameter is provided with a value so that the second performance index meets the second performance index threshold after a previous testing process is terminated, and the second performance index is a set of performance indices for all the testing processes before the current testing process in the current round.

In a possible embodiment of the present disclosure, when the at least two testing processes are performed in parallel in each round, the processor is further configured to: configure a second testing parameter for the to-be-tested object, set a performance index threshold corresponding to each testing process, and perform the at least two testing processes in parallel so as to obtain the testing value of the performance index for each testing process, a value of the second testing parameter being an initial value or a value adjusted after the test in the previous round is terminated; and determine whether each testing process passes the test in accordance with the testing value of the performance index obtained in each testing process and the performance index threshold.

In a possible embodiment of the present disclosure, the at least two testing processes include a first testing process and a second testing process, and there is an association relationship between a performance index measured in the first testing process and a performance index measured in the second testing process. The association relationship includes at least one of that the performance index measured in the first testing process is positively associated with the performance index measured in the second testing process, that the performance index measured in the first testing process is negatively associated with the performance index measured in the second testing process, or the performance index measured in the first testing process and the performance index measured in the second testing process are in a mutual cause-effect relation.

In a possible embodiment of the present disclosure, the processor is further configured to: determine a target performance index in a target application scenario in accordance with a first mapping relationship between an application scenario and the performance index of the to-be-tested object; determine a target testing parameter corresponding to the target performance index in accordance with a second mapping relationship between the performance index and the testing parameter of the to-be-tested object; and generate the at least two testing processes for measuring the target performance index in accordance with the target testing parameter.

In a possible embodiment of the present disclosure, the processor is further configured to: form a polygon with the performance index measured in each testing process as a vertex; take a line connecting a center and each vertex of the polygon as a scale line, and mark a numerical value of a corresponding performance index on the scale line; determine a corresponding threshold point on the scale line in accordance with a performance index threshold for each performance index, and connect the threshold points on the adjacent scale lines sequentially to generate a threshold region corresponding to the performance index threshold; determine a corresponding testing value point on the scale line in accordance with the testing value of the performance index for each testing process, and connect the testing value points on the adjacent scale lines sequentially to generate a testing value region corresponding to the testing value of the performance index; and obtain the testing result indicating whether the to-be-tested object has passed the test in accordance with whether the threshold region is included in the testing value region.

In yet another aspect, the present disclosure provides in some embodiments a testing device, including a processor, a memory, and a program stored in the memory and executed by the processor. The program is executed by the processor so as to implement the steps of the above-mentioned testing method.

In still yet another aspect, the present disclosure provides in some embodiments a computer-readable storage medium storing therein a program. The program is executed by a processor so as to implement the steps of the above-mentioned testing method.

According to the testing method and device in the embodiments of the present disclosure, as compared with the related art, it is able to perform the multi-dimensional test, thereby to meet the requirement on the performance indices in different scenarios, improve the testing efficiency, and increase the reliability of the testing result for true performance of a terminal.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings.

DETAILED DESCRIPTION

Figure 1:
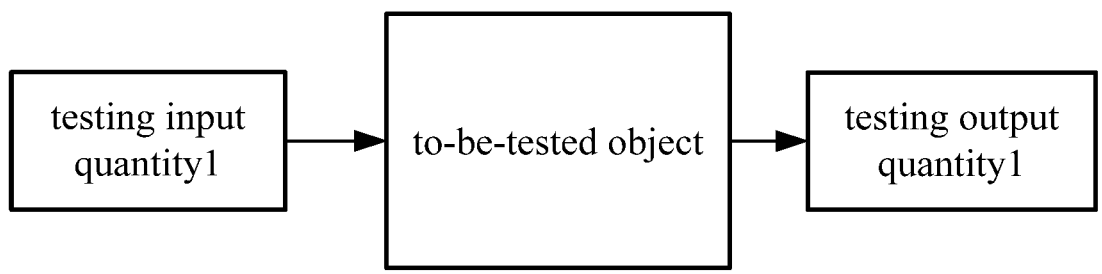
FIG. 1 is a schematic view showing a conventional testing system.
Figure 2:
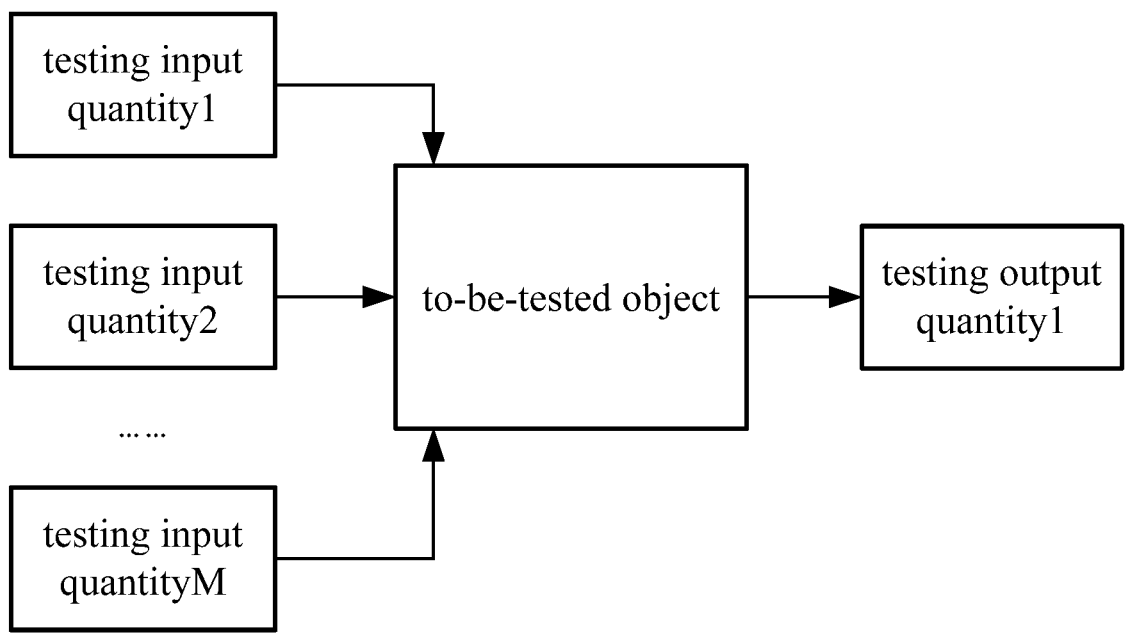
FIG. 2 is another schematic view showing the conventional testing system.
Figure 3:
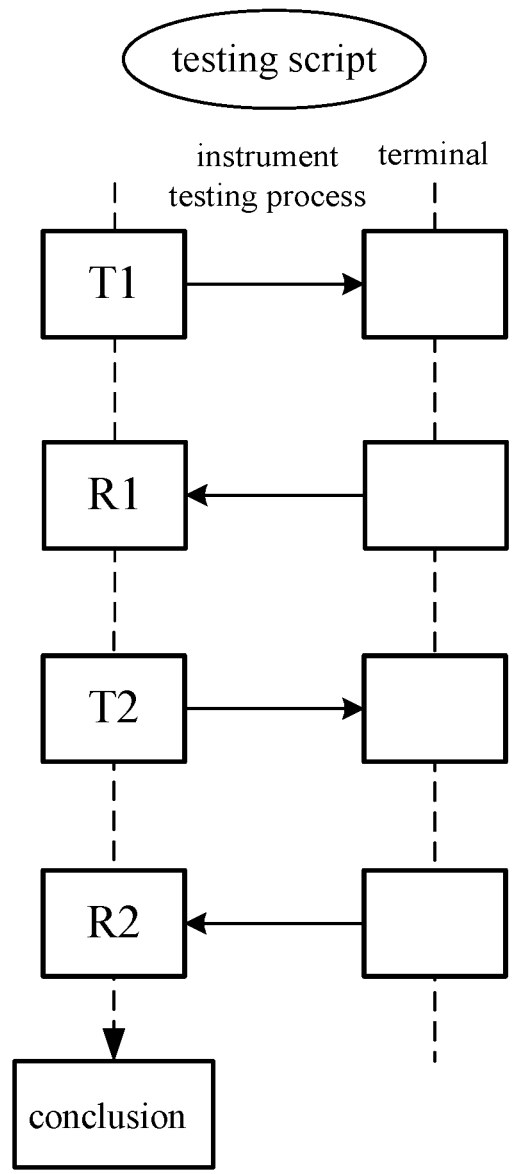
FIG. 3 is a flow chart of a conventional testing method.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" involved in the embodiments of the present disclosure may represent at least one of listed items.

The following description is given for illustrative purposes but shall not be construed as limiting the scope, applicability or configuration set forth in the appended claims. Any alterations may be made on functions and arrangements of the discussed elements without departing from the spirit and scope of the present disclosure. Various procedures or assemblies may be omitted, replaced or added appropriately in the examples. For example, steps of the described method may be performed in an order different from that described in the context, and some steps may be added, omitted or combined. In addition, the features described with reference to some examples may be combined in the other examples.

As mentioned in the background, it is difficult for the conventional testing method to perform the multi-dimensional test. For vertical industry testing scenario, usually it is insufficient to describe a testing result on a single dimension. In a typical vertical industry scenario, usually the testing result needs to be described and evaluated using variables on multiple dimensions. An object of the present disclosure is to provide a testing method, so as to perform the multi-dimensional test and evaluation.

Figure 4:
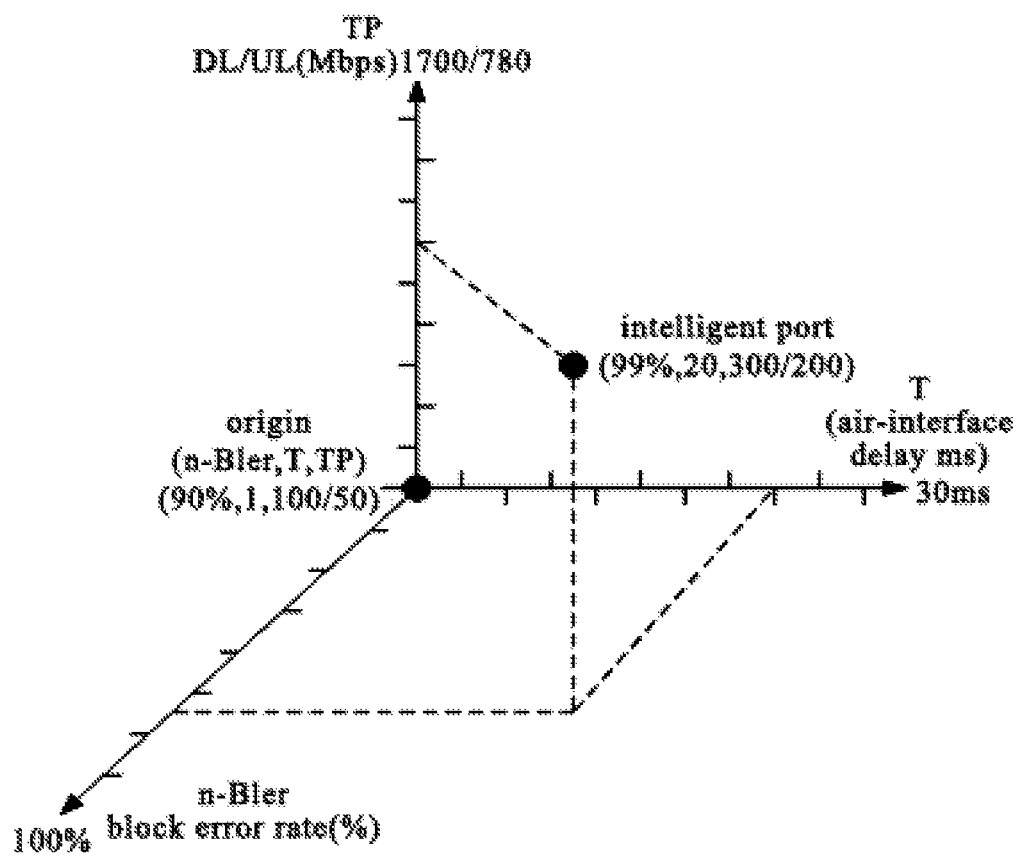
FIG. 4 is a schematic view showing a multi-dimensional industry application scenario according to one embodiment of the present disclosure.
Figure 5:
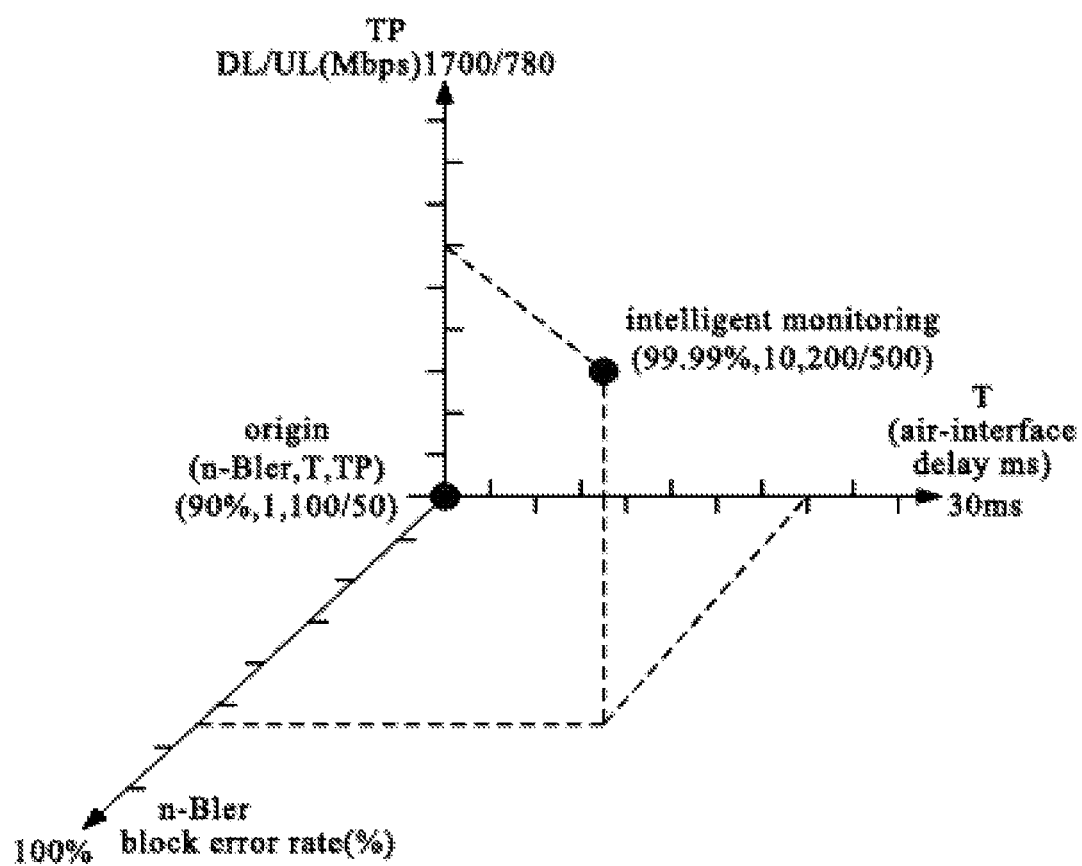
FIG. 5 is another schematic view showing the multi-dimensional industry application scenario according to one embodiment of the present disclosure.

FIGS. 4 and 5 show requirements on the multi-dimensional test in different application scenarios. As shown in FIG. 4, in an application scenario for an intelligent port, a plurality of performance indices (i.e., a plurality of dimensions) of a terminal, e.g., a transmission rate, an air interface delay and decoding accuracy, needs to be tested. As shown in FIG. 5, in an application scenario for intelligent monitoring, a plurality of performance indices (i.e., a plurality of dimensions) of a terminal, e.g., a transmission rate, an air interface delay and decoding accuracy, needs to be tested.

In the embodiments of the present disclosure, a target performance index in a target application scenario is determined in advance in accordance with a first mapping relationship between application scenarios and performance indices of a to-be-tested object (e.g., terminal). Next, a target testing parameter corresponding to the target performance index is determined in accordance with a second mapping relationship between the performance indices and testing parameters of the to-be-tested object (e.g., terminal). Then, at least two testing processes are generated so as to measure the target performance index in accordance with the target testing parameter. Subsequently, the multi-dimensional test is performed in accordance with the at least two testing processes.

Table 1 shows an instance of the first mapping relationship. The application scenarios are determined in accordance with industry dimensions, and key performance requirements are selected in accordance with the application scenarios, so as to form a mapping table about the application scenarios and the key performance indices.

TABLE 1

| Application scenario | Key performance index | | | | | | |
|---|---|---|---|---|---|---|---|
| | Rate | Delay | Reliability | Power consumption | Radiation | Volume | AI/MEC |
| Health care | Y | Y | Y | Y | Y | Y | |
| Workshop | Y | Y | Y | Y | | Y | Y |
| Driving | | Y | Y | | Y | Y | |
| Monitoring | Y | Y | | Y | | | |
| Port | Y | Y | Y | Y | | | |
| Mine | Y | Y | Y | Y | | | |
| School | Y | Y | | Y | Y | Y | Y |
| Home | | Y | | Y | Y | Y | |
| Office | Y | Y | | | | Y | Y |
| Agriculture | Y | Y | | Y | | | |
| Highway/railway | Y | Y | Y | | | Y | Y |

TABLE 1-continued

| Application scenario | Key performance index | | | | | | |
|---|---|---|---|---|---|---|---|
| | Rate | Delay | Reliability | Power consumption | Radiation | Volume | AI/MEC |
| Space network | Y | Y | Y | | | | Y |
| Positioning/tracking | | Y | Y | Y | Y | Y | |

Table 2 shows an instance of the second mapping relationship. The key performance indices are refined, and configurations and requirements of key testing parameters are selected, so as to form a mapping table about the key performance indices and the key testing parameters.

TABLE 2

| Key performance index | Key technique points | | | | | | | | | | |
|---|---|---|---|---|---|---|---|---|---|---|---|
| | Frame structure | Quantity of HARQs | BWP | Initial BLER | Modulation mode | Slice | Quantity of antennae | ARQ | Application type | Uplink enhancement | High power |
| Rate | Y | Y | Y | Y | Y | Y | Y | Y | | Y | Y |
| Delay | Y | Y | | Y | Y | | | Y | | | |
| Reliability | | Y | | Y | Y | | | | Y | | |
| Power consumption | Y | | Y | | Y | | Y | | | Y | Y |
| Radiation | Y | | | | | | Y | | | | Y |
| Volume | | | | | | | Y | | | | Y |
| AI/MEC | | | | | | | | | | | |

Based on the above two tables, a mapping table about the application scenarios and the key testing parameters is finally obtained. Next, the to-be-measured target performance index and the target testing parameter corresponding to each performance index are determined in the to-be-measured target application scenario. Then, at least two testing processes are generated to measure the target performance index in accordance with the target testing parameter, and one or more target performance indices are measured through the testing processes.

Figure 6:
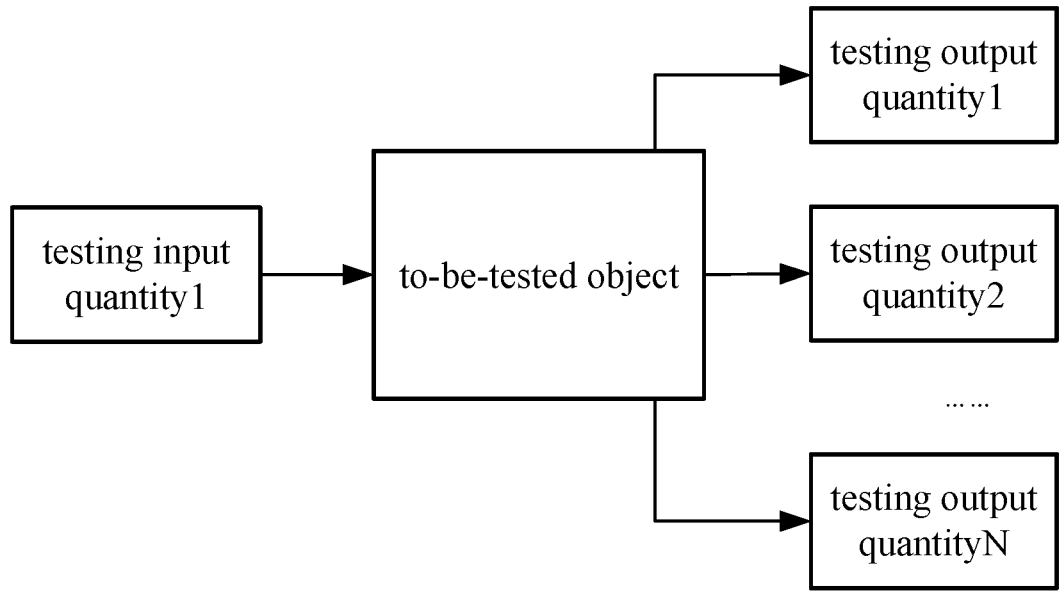
FIG. 6 is a schematic view showing a multi-dimensional testing system according to one embodiment of the present disclosure.
Figure 7:
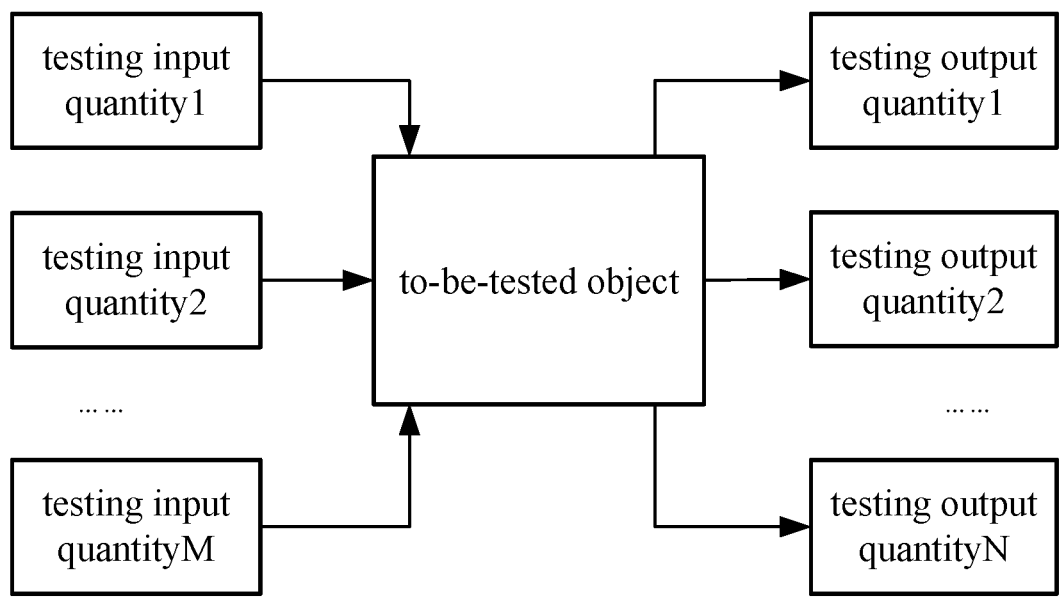
FIG. 7 is another schematic view showing the multi-dimensional testing system according to one embodiment of the present disclosure.

FIGS. 6 and 7 show a multi-dimensional testing system in the embodiments of the present disclosure. In FIG. 6, a testing input quantity 1 is configured for the to-be-tested object, and a plurality of testing output quantities 1 to N of the to-be-tested object is tested. In FIG. 7, a plurality of testing input quantities 1 to M is configured for the to-be-tested object, and a plurality of testing output quantities 1 to N of the to-be-tested object is tested. Here, N is equal to, or different from, M.

As compared with the single-input-single-output or multi-input-single-output testing method in the related art, in the multi-dimensional testing method according to the embodiments of the present disclosure, a plurality of testing processes is introduced. Through the mutual influences and iterations between the testing processes, the mutual influence between multiple dimensions is simulated. An output of one testing process is taken as an input of another testing process, and through the iterations and traversing, a comprehensive testing result is outputted finally.

Figure 8:
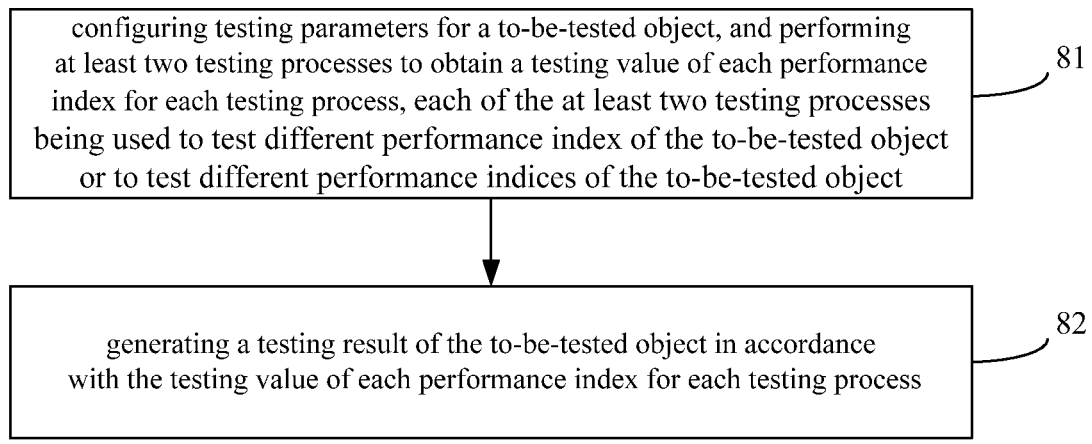
FIG. 8 is a flow chart of a testing method according to one embodiment of the present disclosure.

As shown in FIG. 8, the present disclosure provides in some embodiments a testing method, which includes the following steps.

Step 81: configuring one or more testing parameters for a to-be-tested object, and performing at least two testing processes to obtain a testing value of each performance index for each testing process, each of the at least two testing processes being used to test different performance index of the to-be-tested object or to test different performance indices of the to-be-tested object.

Here, the to-be-tested object is a terminal, a base station or a system. Each testing process is used to test different performance indices of the to-be-tested object. For ease of processing, each testing process is used to test one performance index. To be specific, the at least two testing processes include a first testing process and a second testing process, and there is an association relationship between a performance index measured in the first testing process and a performance index measured in the second testing process.

Here, the association relationship includes at least one of that the performance index measured in the first testing process is positively associated with the performance index measured in the second testing process, that the performance index measured in the first testing process is negatively associated with the performance index measured in the second testing process, or the performance index measured in the first testing process and the performance index measured in the second testing process are in a mutual cause-effect relation. When the performance index measured in the first testing process is positively associated with the performance index measured in the second testing process, it means that the performance index measured in the first testing process increases along with an increase in the performance index measured in the second testing process, or decreases along with a decrease in the performance index measured in the second testing process. When the performance index measured in the first testing process is negatively associated with the performance index measured in the second testing process, it means that the performance index measured in the first testing process increases along with a decrease in the performance index measured in the second testing process, or decreases along with an increase in the performance index measured in the second testing process. When the performance index measured in the first testing process and the performance index measured in the second testing process are in a mutual cause-effect relation, it means that a testing result of the first testing process (e.g., the obtained performance index) serves as a configuration of a testing parameter or a testing condition for the second testing process, and a testing result of the second testing process also serves as a configuration of a testing parameter or a testing condition for the first testing process.

Step 82: generating a testing result of the to-be-tested object in accordance with the testing value of each performance index for each testing process.

Through the above steps, it is able for the multi-dimensional testing method in the embodiments of the present disclosure to describe and evaluate the to-be-tested object on multiple dimensions in accordance with the testing result.

In Step 81, a test is performed for at least one round, and in each round, the one or more testing parameters are configured for the to-be-tested object and a performance index threshold is set.

To be specific, the at least two testing processes are performed sequentially or in parallel in each round. The following description will be given when the at least two testing processes are performed sequentially or when the at least two testing processes are performed in parallel.

When the at least two testing processes are performed sequentially in each round, the testing processes are performed sequentially in accordance with a predetermined order of the testing processes. The performing a current testing process includes the following steps.

A) Configuring a first testing parameter for the to-be-tested object, setting a first performance index threshold, and in the case that a second performance index meets a second performance index threshold, performing the current testing process to obtain a testing value of a first performance index for the current testing process.

When the current testing process is a first testing process in a current round, a value of the first testing parameter is an initial value or a value adjusted in accordance with a testing result of a previous round. When the current testing process is not the first testing process in the current round, the first testing parameter is provided with a value so that the second performance index meets the second performance index threshold after a previous testing process is terminated, and the second performance index is a set of performance indices for all the testing processes before the current testing process in the current round. Here, the value adjusted in accordance with the testing result of the previous round is determined in accordance with a specific testing parameter and an application scenario, and this value is adjusted in such a manner that, as compared with a parameter value before the adjustment, the first performance index meets the requirement on the first performance index threshold in an easier manner with the adjusted parameter value.

In addition, the first testing parameter is specifically a set of testing parameters configured for all the testing processes in each round.

B) Determining whether the current testing process passes the test in accordance with the testing value of the first performance index and the first performance index threshold.

Here, when the current testing process fails to pass the test, the test in the current round is terminated, and when the current testing process passes the test and the current testing process is a last testing process in the current round, the test in the current round is terminated. In addition, whether to continue to perform the test in a next round is determined in accordance with a predetermined testing plan.

Here, when the current testing process passes the test and the current testing process is not the last testing process in the current round, the test in a next testing process of the current testing process is performed. Through performing the above steps sequentially, it is able to complete all the testing processes in the current round, or terminate in advance the testing process in the current round.

In Step 82, when the test in the current round is terminated and all the testing processes pass the test, the test in the current round is determined to be passed, and when the test in the current round is terminated and there are one or more testing processes which fail to pass the test, the test in the current round is determined not to be passed.

In a possible embodiment of the present disclosure, when the test in the current round is terminated and all the testing processes pass the test, the testing result indicating that the to-be-tested object has passed the test is outputted; and when the test in the current round is terminated and there are one or more testing processes which fail to pass the test, the testing result indicating that the to-be-tested object fails to pass the test is outputted.

In a possible embodiment of the present disclosure, when the test in the current round is terminated, the testing value of each performance index obtained in the current round is further outputted.

In the above testing mode, the plurality of testing processes is performed in turn. The output of the first testing process serves as the input of the second testing process, and the output of the second testing process serves as the input of the first testing process again in an iterative test.

Figure 9:
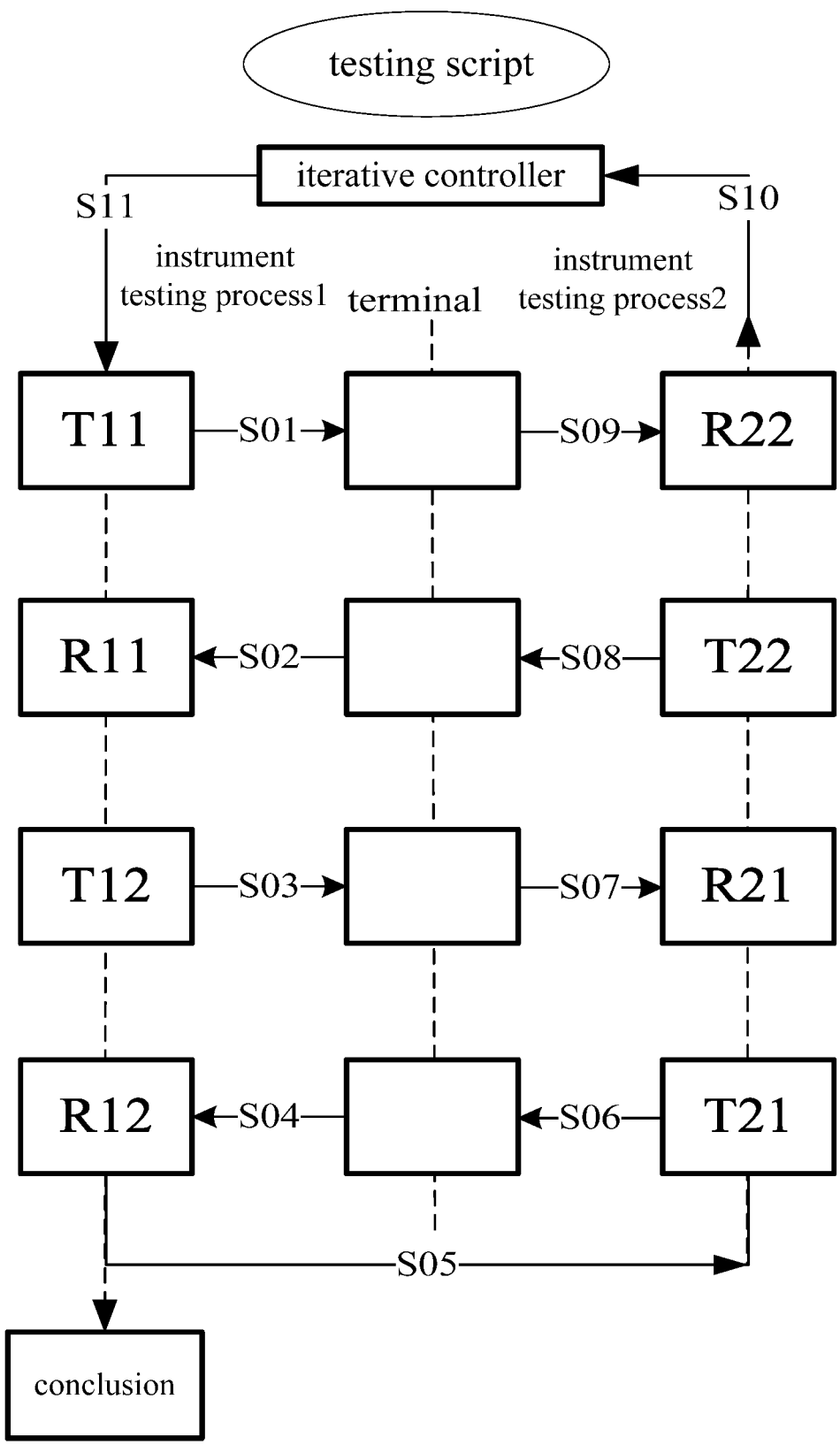
FIG. 9 is a schematic view showing an instance where testing processes are performed sequentially through the testing method according to one embodiment of the present disclosure.

FIG. 9 shows an instance where two testing processes, i.e., instrument testing processes 1 and 2, are performed sequentially to test the terminal, where T and R represent transmission and reception respectively. The instrument testing process 1 and the instrument testing process 2 output a testing output quantity 1 and a testing output quantity 2 respectively. Testing results of both the testing output quantity 1 and the testing output quantity 2 need to be taken into consideration so as to give an overall conclusion. In the embodiments of the present disclosure, the testing output quantity is just the performance index measured in the testing process. The instrument testing process 1 and the instrument testing process 2 are two testing processes conditioned upon each other and associated with each other, so the associative test needs to be performed so as to obtain a meaningful testing conclusion, i.e., an output of the instrument testing process 1 is an input of the instrument testing process 2, and an output of the instrument testing process 2 is also an input of the instrument testing process 1. The two testing processes are closely related to each other and conditioned upon each other.

Taking a "throughput-power consumption" test as an example, the instrument testing process 1 represents a throughput testing process, and the instrument testing process 2 represents a power consumption testing process. In order to increase the throughput, the large power consumption may occur for the terminal. In other words, an increase in the throughput of the terminal leads to a decrease in the power consumption of the terminal, and an increase in the power consumption of the terminal also leads to a decrease in the throughput of the terminal. Hence, the two to-be-measured quantities which are conditioned upon each other and associated with each other need to be tested in parallel in an associative manner, so as to obtain a meaningful testing conclusion.

In each round, the instrument testing process 1 is performed prior to the instrument testing process 2. In S01, a testing parameter 1 is transmitted through instrument to the terminal, so as to configure the testing parameter 1 for the terminal, thereby to perform the instrument testing process 1. In S02, a performance index 1 of the terminal is received or measured, and whether the instrument testing process 1 passes the test is determined. When the instrument testing process fails to pass the test, S03 is performed, and an adjusted testing parameter 1 is transmitted through the instrument to the terminal so as to perform the instrument testing process 1 again. In S04, the performance index 1 of the terminal is received or measured, and whether the instrument testing process 1 passes the test is determined. When the instrument testing process 1 passes the test, the performance index is substituted into the instrument testing process 2, so as to perform the instrument testing process 2. When performing the instrument testing process 2, in S06, a testing parameter 2 and the performance index 1 are transmitted through the instrument to the terminal, so as to configure the testing parameter for the terminal, thereby to perform the instrument testing process 2. In S07, a performance index 2 of the terminal is received or measured, and whether the instrument testing process 2 passes the test is determined. When the instrument testing process 2 fails to pass the test, S08 is performed, and an adjusted testing parameter 2 is transmitted through the instrument to the terminal, so as to perform the instrument testing process 2 again. In S09, the performance index 2 of the terminal is received or measured, and whether the instrument testing process 2 passes the test is determined. When the instrument testing process 2 passes the test, in S10, whether to continue to perform the test in a next round and whether to configure or update the one or more testing parameters for the test in the next round are determined through an iterative controller. When the test in the next round is to be performed, S11 is performed, and the above same or similar steps are repeated.

Two examples where the testing processes are performed sequentially will be given as follows.

First Example

In a service requirement scenario, the requirement on "throughput-power consumption" includes that the TCP throughput of an uplink static channel is not smaller than 500 Mbps and the power consumption is not greater than 200 mA.

Step 1: a testing process 1 ($T_{11}$-S01-S02->$R_{11}$, $T_{12}$-S03-S04->$R_{12}$) is performed. Under a certain testing condition, e.g., UL 256QAM, UL 2*2 MIMO, 100 MHz total resource allocation under SA, SCS=30 KHz and DL/UL switching periodicity=5 ms, when Pmax_out=26 dBm, the TCP throughput of the uplink static channel is 750 Mbps, which meets the testing requirement "the TCP throughput of an uplink static channel is not smaller than 500 Mbps".

Under the above-mentioned testing condition and on the premise that the TCP throughput of the uplink static channel is 750 Mbps (-5->), a testing process 2 ($T_{21}$-S06-S07->$R_{21}$, $T_{22}$-S08-S09->$R_{22}$) is performed. At this time, the power consumption is 250 mA, which does not meet the testing requirement "the power consumption is not greater than 200 mA".

Step 2: Pmax_out is re-adjusted down to 25 dBm through the iterative controller (-S10-S11->), and then the testing process 1 ($T_{11}$-S01-S02->$R_{11}$, $T_{12}$-S03-S04->$R_{12}$) is performed again. At this time, the TCP throughput of the uplink static channel is 650 Mbps, which meets the testing requirement "the TCP throughput of an uplink static channel is not smaller than 500 Mbps".

Under the above-mentioned testing condition and on the premise that the TCP throughput of the uplink static channel is 650 Mbps (-S05->), the testing process 2 ($T_{21}$-6-7->$R_{21}$, $T_{22}$-8-9->$R_{22}$) is performed again. At this time, the power consumption is 220 mA, which still does not meet the testing requirement "the power consumption is not greater than 200 mA".

Step 3: Pmax_out is re-adjusted down to 24 dBm through the iterative controller (-S10-S11->), and then the testing process 1 ($T_{11}$-S01-S02->$R_{11}$, $T_{12}$-S03-S04->$R_{12}$) is performed again. At this time, the TCP throughput of the uplink static channel is 550 Mbps, which meets the testing requirement "the TCP throughput of an uplink static channel is not smaller than 500 Mbps".

Under the above-mentioned testing condition and on the premise that the TCP throughput of the uplink static channel is 550 Mbps (-5->), the testing process 2 ($T_{21}$-S06-S07->$R_{21}$, $T_{22}$-S08-S09->$R_{22}$) is performed again. At this time, the power consumption is 190 mA, which meets the testing requirement "the power consumption is not greater than 200 mA".

At this time, the test is completed, and the testing result is "PASS".

Second Example

In a service requirement scenario, the requirement on "throughput-power consumption" includes that the TCP throughput of an uplink static channel is not smaller than 500 Mbps and the power consumption is not greater than 200 mA.

Step 1: a testing process 1 ($T_{11}$-S01-S02->$R_{11}$, $T_{12}$-S03-S04->$R_{12}$) is performed. Under a certain testing condition, e.g., UL 256QAM, UL 2*2 MIMO, 100 MHz total resource allocation under SA, SCS=30 KHz and DL/UL switching periodicity=5 ms, when Pmax_out=26 dBm, the TCP throughput of the uplink static channel is 750 Mbps, which meets the testing requirement "the TCP throughput of an uplink static channel is not smaller than 500 Mbps".

Under the above-mentioned testing condition and on the premise that the TCP throughput of the uplink static channel is 750 Mbps (-5->), a testing process 2 ($T_{21}$-S06-S07->$R_{21}$, $T_{22}$-S08-S09->$R_{22}$) is performed. At this time, the power consumption is 250 mA, which does not meet the testing requirement "the power consumption is not greater than 200 mA".

Step 2: Pmax_out is re-adjusted down to 25 dBm through the iterative controller (-S10-S11->), and then the testing process 1 ($T_{11}$-S01-S02->$R_{11}$, $T_{12}$-S03-S04->$R_{12}$) is performed again. At this time, the TCP throughput of the uplink static channel is 550 Mbps, which meets the testing requirement "the TCP throughput of an uplink static channel is not smaller than 500 Mbps".

Under the above-mentioned testing condition and on the premise that the TCP throughput of the uplink static channel is 550 Mbps (-S05->), the testing process 2 ($T_{21}$-S06-S07->$R_{21}$, $T_{22}$-S08-S09->$R_{22}$) is performed again. At this time, the power consumption is 220 mA, which still does not meet the testing requirement "the power consumption is not greater than 200 mA".

Step 3: Pmax_out is re-adjusted down to 24 dBm through the iterative controller (-S10-S11->), and then the testing process 1 ($T_{11}$-S01-S02->$R_{11}$, $T_{12}$-S03-S04->$R_{12}$) is performed again. At this time, the TCP throughput of the uplink static channel is 550 Mbps, which does not meet the testing requirement "the TCP throughput of an uplink static channel is not smaller than 500 Mbps".

Under the above-mentioned testing condition and on the premise that the TCP throughput of the uplink static channel is 450 Mbps (-5->), the testing process 2 ($T_{21}$-S06-S07->$R_{21}$, $T_{22}$-S08-S09->$R_{22}$) is performed again. At this time, the power consumption is 190 mA, which meets the testing requirement "the power consumption is not greater than 200 mA".

At this time, the test is completed, and the testing result is "FAIL".

The specific implementation of performing the at least two testing processes will be described hereinafter.

When the at least two testing processes are performed in parallel in each round, A) a second testing parameter is configured for the to-be-tested object, a performance index threshold corresponding to each testing process is set, and the at least two testing processes are performed in parallel so as to obtain the testing value of the performance index for each testing process. A value of the second testing parameter is an initial value or a value adjusted after the test in the previous round is terminated.

Here, the second testing parameter is specifically a set of testing parameters to be configured for all the testing process in each round.

B) Whether the current testing process passes the test is determined in accordance with the testing value of the performance index obtained in each testing process and the performance index threshold.

Here, the test in the current round is terminated when any testing process in the current round fails to pass the test, and the test in the current round is terminated when all the testing processes in the current round pass the test.

Further, when the test in the current round is terminated and all the testing processes pass the test, the test in the current round is determined to be passed; and when the test in the current round is terminated and there are one or more testing processes which fail to pass the test, the test in the current round is determined not to be passed.

Further, the testing value of each performance index obtained in the current round is outputted when the test in the current round is terminated.

For example, based on a same initial testing configuration, a plurality of testing processes is performed concurrently. The test is determined as "PASS" only when the testing outputs of the plurality of testing processes meet the requirements on the testing indices. When it is impossible for the outputs of the plurality of testing processes to meet the requirements on the testing indices after multiple iterations, the test is determined to as "FAIL".

For a same group of testing requirements, as compared with the multi-dimensional testing mode where the testing processes are performed sequentially, it takes a short time period to perform the testing processes in parallel, but a parallel processing capability of the testing system is highly demanded.

Figure 10:
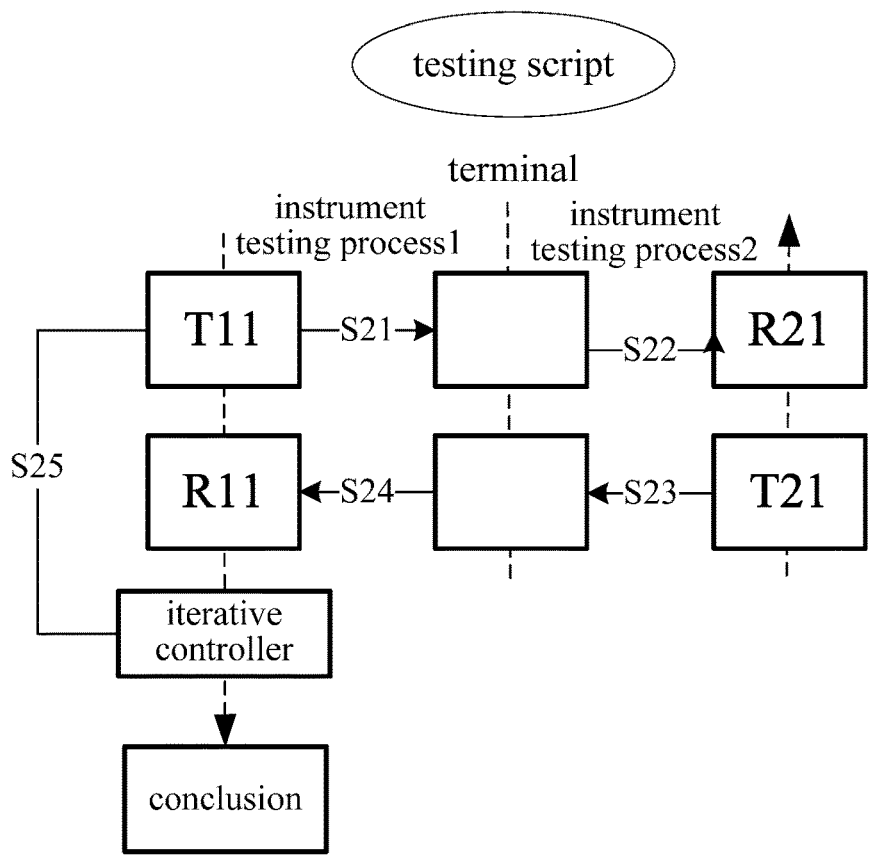
FIG. 10 is a schematic view showing an instance where testing processes are performed in parallel through the testing method according to one embodiment of the present disclosure.

FIG. 10 shows an instance where two testing processes, i.e., instrument testing processes 1 and 2, are performed in parallel to test the terminal, where T and R represent transmission and reception respectively. The instrument testing process 1 and the instrument testing process 2 output a testing output quantity 1 and a testing output quantity 2 respectively. Testing results of both the testing output quantity 1 and the testing output quantity 2 need to be taken into consideration so as to give an overall conclusion.

In each round, the instrument testing process 1 and the instrument testing process 2 are performed in parallel. In S21 and S22, a testing parameter 1 is transmitted through instrument to the terminal, so as to configure the testing parameter 1 for the terminal. In S23 and S24, the instrument testing processes 1 and 2 are performed in parallel, and whether the instrument testing processes 1 and 2 pass the test is determined. When they pass the test, in S25, whether to continue to perform the test in a next round and configure or update the testing parameter in the next round is determined through an iterative controller. When the test in the next round is to be performed, S21 is performed, and the above steps are repeated. When they fail to pass the test, whether a predetermined quantity of rounds has been reached is determined. When the predetermined quantity of rounds has been reached, the test is terminated, otherwise, the testing parameter in the next round is adjusted and then the test is performed in the next round.

Two examples where the testing processes are performed in parallel will be given as follows.

Third Example

In a service requirement scenario, the requirement on "throughput-power consumption" includes that the TCP throughput of an uplink static channel is not smaller than 500 Mbps and the power consumption is not greater than 200 mA.

Step 1: the entire testing system is configured under a certain testing condition ($T_{11}$-S21-S22->$R_{21}$). Under the testing condition, e.g., UL 256QAM, UL 2*2 MIMO, 100 MHz total resource allocation under SA, SCS=30 KHz and DL/UL switching periodicity=5 ms, when Pmax_out=26 dBm, the power consumption is 250 mA ($T_{21}$-S23-S24->$R_{11}$), which does not meet the testing requirement "the power consumption is not greater than 200 mA", and the TCP throughput of the uplink static channel is 750 Mbps, which meets the testing requirement "the TCP throughput of an uplink static channel is not smaller than 500 Mbps".

Step 2: Pmax_out is re-adjusted down to 25 dBm through the iterative controller (-S25->), and then the entire testing system is configured again ($T_{11}$-S21-S22->$R_{21}$). Under the testing condition, e.g., UL 256QAM, UL 2*2 MIMO, 100 MHz total resource allocation under SA, SCS=30 KHz and DL/UL switching periodicity=5 ms, when Pmax_out=25 dBm, the power consumption is 220 mA ($T_{21}$-S23-S24->$R_{11}$), which does not meet the testing requirement "the power consumption is not greater than 200 mA", and the TCP throughput of the uplink static channel is 650 Mbps, which meets the testing requirement "the TCP throughput of an uplink static channel is not smaller than 500 Mbps".

Step 3: Pmax_out is re-adjusted down to 24 dBm through the iterative controller (-S25->), and then the entire testing system is configured again ($T_{11}$-S21-S22->$R_{21}$). Under the testing condition, e.g., UL 256QAM, UL 2*2 MIMO, 100 MHz total resource allocation under SA, SCS=30 KHz and DL/UL switching periodicity=5 ms, when Pmax_out=24 dBm, the power consumption is 190 mA ($T_{21}$-S23-S24->$R_{11}$), which meets the testing requirement "the power consumption is not greater than 200 mA", and the TCP throughput of the uplink static channel is 550 Mbps, which meets the testing requirement "the TCP throughput of an uplink static channel is not smaller than 500 Mbps".

At this time, the test is completed, and the testing result is "PASS".

Fourth Example

In a service requirement scenario, the requirement on "throughput-power consumption" includes that the TCP throughput of an uplink static channel is not smaller than 500 Mbps and the power consumption is not greater than 200 mA.

Step 1: the entire testing system is configured under a certain testing condition ($T_{11}$-S21-S22->$R_{21}$). Under the testing condition, e.g., UL 256QAM, UL 2*2 MIMO, 100 MHz total resource allocation under SA, SCS=30 KHz and DL/UL switching periodicity=5 ms, when Pmax_out=26 dBm, the power consumption is 250 mA ($T_{21}$-S23-S24->$R_{11}$), which does not meet the testing requirement "the power consumption is not greater than 200 mA", and the TCP throughput of the uplink static channel is 750 Mbps, which meets the testing requirement "the TCP throughput of an uplink static channel is not smaller than 500 Mbps".

Step 2: Pmax_out is re-adjusted down to 25 dBm through the iterative controller (-S25->), and then the entire testing system is configured again ($T_{11}$-S21-S22->$R_{21}$). Under the testing condition, e.g., UL 256QAM, UL 2*2 MIMO, 100 MHz total resource allocation under SA, SCS=30 KHz and DL/UL switching periodicity=5 ms, when Pmax_out=25 dBm, the power consumption is 220 mA ($T_{21}$-S23-S24->$R_{21}$), which does not meet the testing requirement "the power consumption is not greater than 200 mA", and the TCP throughput of the uplink static channel is 550 Mbps, which meets the testing requirement "the TCP throughput of an uplink static channel is not smaller than 500 Mbps".

Step 3: Pmax_out is re-adjusted down to 24 dBm through the iterative controller (-S25->), and then the entire testing system is configured again ($T_{11}$-S21-S22->$R_{21}$). Under the testing condition, e.g., UL 256QAM, UL 2*2 MIMO, 100 MHz total resource allocation under SA, SCS=30 KHz and DL/UL switching periodicity=5 ms, when Pmax_out=24 dBm, the power consumption is 190 mA ($T_{21}$-S23-S24->$R_{11}$), which meets the testing requirement "the power consumption is not greater than 200 mA", and the TCP throughput of the uplink static channel is 450 Mbps, which meets the testing requirement "the TCP throughput of an uplink static channel is not smaller than 500 Mbps".

At this time, the test is completed, and the testing result is "FAIL".

In addition, through the testing method in the embodiments of the present disclosure, it is also able to optimize a testing process of an existing terminal conformance test case, so as to improve the testing efficiency and increase the reliability of the testing result for true performance of the terminal.

For the existing terminal conformance test cases, e.g., Adjacent Channel Leakage Ratio (ACLR) and Spectrum Emission Mask (SEM), during the test, it is necessary to determine a Maximum Power Rollback (MPR) testing point, and test the test cases ACLR and SEM under the condition that the MPR testing point meets the requirement. The test cases ACLR and SEM are closely related with an MPR test case.

The ACLR, SEM and MPR are test cases independent of each other. In order to reflect the relevancy in the testing (ensure that the ACLR/MPR test case and the SEM/MPR test case are performed by a same terminal), for the existing ACLR and SEM test cases, it is necessary to repeatedly test the MPR testing points during the testing.

When the mode of performing the testing processes sequentially in the above-mentioned multi-dimensional testing method is adopted, it is able to sequentially complete the MPR test with respect to each MPR testing point and the ACLR or SEM test at a corresponding MPR testing point under the same testing condition, thereby to solve the problem in the existing testing mode where the MPR testing point needs to be repeatedly tested in the MPR and ACLR/SEM test cases.

When the mode of performing the testing processes in parallel in the above-mentioned multi-dimensional testing method is adopted, it is able to concurrently complete the MPR test with respect to each MPR testing point and the ACLR or SEM test at a corresponding MPR testing point under the same testing condition, thereby to solve the problem in the existing testing mode where the MPR testing point needs to be repeatedly tested in the MPR and ACLR/SEM test cases, and remarkably reduce the testing time. However, the testing system needs to process the MPR and the ACLR/SEM test cases simultaneously, so the parallel processing capability of the testing system is highly demanded.

In addition, in the current test and verification of the terminal, in order to improve the testing efficiency, reduce the testing time and obtain a better testing result, many factories provide a plurality of terminals for the test in parallel, so a plurality of associated indices may be actually tested for different terminals, and it is impossible to reflect the true performance of each terminal.

For example, a first index is tested for a first terminal, a second index is tested for a second terminal, and a third index is tested for a third terminal. Although the three indices have passed the test, but it is impossible to determine that the three indices pass the test for a same terminal. A test bug may occur. Because the plurality of testing indices of the terminal is closely related to each other, the first index may be deteriorated when the second index is optimized. When the above-mentioned multi-dimensional testing method 1 or 2 is adopted, it is able to ensure that the plurality of related indices is tested for a same terminal under a same testing condition. As a result, it is able to prevent the occurrence of such a test bug that several test cases, rather than all test cases, are tested for different terminals or under different testing conditions.

In addition, it should be appreciated that, the testing process in the embodiments of the present disclosure include at least one testing sub-process. In this way, in the case of more than two testing processes, a testing process embedding mode is adopted, and the more than two testing processes are taken as testing sub-processes, so as to obtain more than two testing sub-processes. Next, these testing sub-processes are assigned to two testing processes, and each testing process includes at least one testing sub-process. Then, the two testing processes are tested in parallel or sequentially as mentioned hereinabove, which will not be particularly defined herein.

Sixth Example

In the above first to fourth examples, when the test is performed with respect to Pmax_out=26 dBm, 25 dBm and 24 dBm, the testing process 1 or the testing process 2 may further include a testing sub-process "configured transmitted power", i.e., a network parameter Pcmax in the testing instrument is set, so as to control output power of the terminal, i.e., Pmax_out=26 dBm, 25 dBm and 24 dBm.

The testing sub-process "configured transmitted power" and a testing sub-process "power consumption" together form the above-mentioned testing process 1. The testing sub-process "configured transmitted power" and a testing sub-process "TCP throughput of uplink static channel" together form the above-mentioned testing process 2.

Next, a mode of analyzing the testing result is provided, and it may be applied in Step 82. To be specific, in Step 82, when generating the testing result of the to-be-tested object in accordance with the testing value of each performance index for each testing process, a polygon is formed with the performance index measured in each testing process as a vertex. Next, a line connecting a center and each vertex of the polygon is taken as a scale line, and a numerical value of a corresponding performance index is marked on the scale line. Next, a corresponding threshold point is determined on the scale line in accordance with a performance index threshold for each performance index, and the threshold points on the adjacent scale lines are connected sequentially to generate a threshold region corresponding to the performance index threshold. Next, a corresponding testing value point is determined on the scale line in accordance with the testing value of the performance index for each testing process, and the testing value points on the adjacent scale lines are connected sequentially to generate a testing value region corresponding to the testing value of the performance index. Then, the testing result indicating whether the to-be-tested object has passed the test is obtained in accordance with whether the threshold region is included in the testing value region.

For example, when the threshold region is completely included in the testing value region, the testing result indicating that the to-be-tested object passes the test is obtained, otherwise, the testing result indicating that the to-be-tested object fails to pass the test is obtained.

In other words, a criterion polygon is formed in accordance with multi-dimensional criteria. When the testing output quantity falls within a region defined by the criterion polygon, the to-be-tested object is determined to pass the test (PASS), and when the testing output quantity is beyond the region defined by the criterion polygon, the to-be-tested object is determined to fail to pass the test (FAIL).

Figure 11:
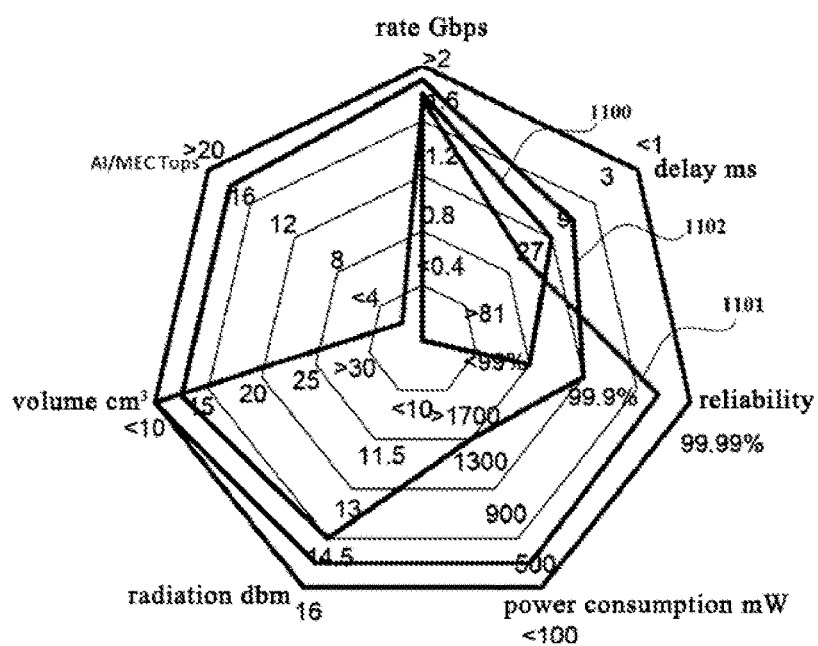
FIG. 11 is a schematic view showing an instance of a criterion polygon according to one embodiment of the present disclosure.

FIG. 11 shows an instance of the criterion polygon, which includes three performance indices, i.e., rate, delay and reliability, without taking the other indices such as volume and radiation into consideration. Taking a region 1100 corresponding to "eMBB requirement", as shown in FIG. 11, a region 1101 corresponding to "device 1 capability" does not completely cover the region 1100 corresponding to "eMBB requirement", so "device 1" is determined as "FAIL"; and a region 1102 corresponding to "device 2 capability" completely covers the region 1100 corresponding to "eMBB requirement", so "device 2" is determined as "PASS".

Based on the above, according to the testing method in the embodiments of the present disclosure, it is able to perform the multi-dimensional test with respect to different application scenarios. In addition, the testing method is also used to optimize the testing process for an existing terminal conformance test case. As a result, it is able to improve the testing efficiency, and increase the reliability of the testing result for true performance of the terminal.

The testing method has been described hereinabove, and a device for implementing the testing method will be described hereinafter.

Figure 12:
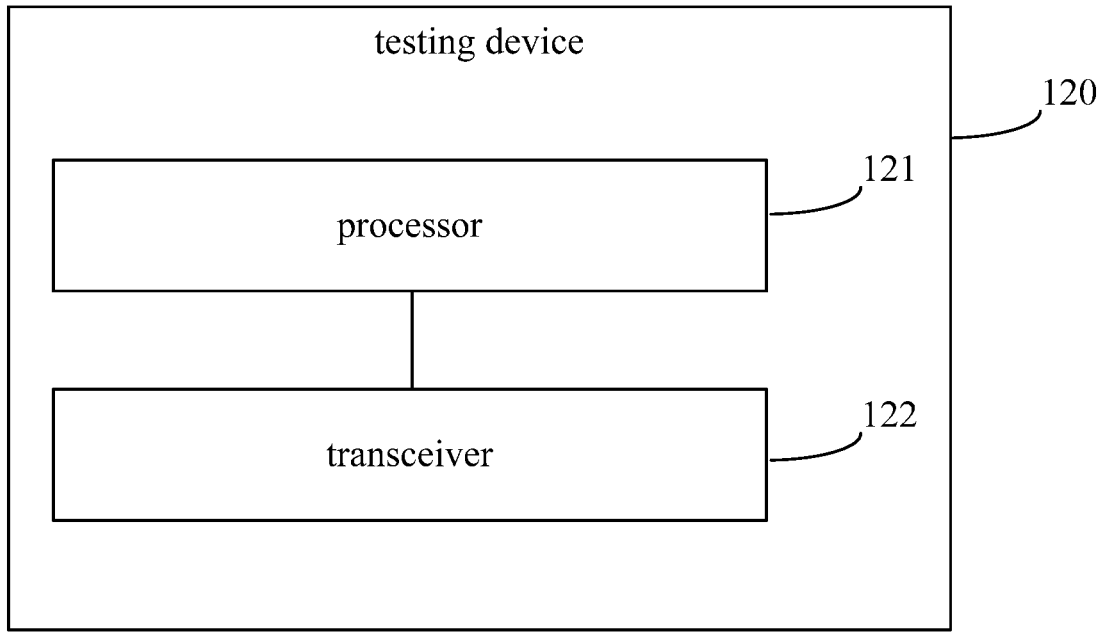
FIG. 12 is a schematic view showing a testing device according to one embodiment of the present disclosure.

As shown in FIG. 12, the present disclosure provides in some embodiments a testing device 120, which includes a transceiver 122 and a processor 121. The transceiver 122 is configured to configure one or more testing parameters for a to-be-tested object. The processor 121 is configured to: perform at least two testing processes to obtain a testing value of each performance index for each testing process, each of the at least two testing processes being used to test different performance index of the to-be-tested object or to test different performance indices of the to-be-tested object; and generate a testing result of the to-be-tested object in accordance with the testing value of each performance index for each testing process.

In a possible embodiment of the present disclosure, the processor 121 is further configured to perform test for at least one round, and in each round, the one or more testing parameters are configured for the to-be-tested object and a performance index threshold is set.

In a possible embodiment of the present disclosure, the processor 121 is further configured to, when the at least two testing processes are performed sequentially in each round, perform the testing processes sequentially in accordance with a predetermined order of the testing processes. The performing a current testing process includes: configuring a first testing parameter for the to-be-tested object, setting a first performance index threshold, and in the case that a second performance index meets a second performance index threshold, performing the current testing process to obtain a testing value of a first performance index for the current testing process; and determining whether the current testing process passes the test in accordance with the testing value of the first performance index and the first performance index threshold.

In a possible embodiment of the present disclosure, when the current testing process is a first testing process in a current round, a value of the first testing parameter is an initial value or a value adjusted in accordance with a testing result of a previous round; and when the current testing process is not the first testing process in the current round, the first testing parameter is provided with a value so that the second performance index meets the second performance index threshold after a previous testing process is terminated, and the second performance index is a set of performance indices for all the testing processes before the current testing process in the current round.

In a possible embodiment of the present disclosure, the processor 121 is further configured to: when the current testing process fails to pass the test, terminate the test in the current round; when the current testing process passes the test and the current testing process is a last testing process in the current round, terminate the test in the current round; and when the current testing process passes the test and the current testing process is not the last testing process in the current round, perform the test in a next testing process of the current testing process.

In a possible embodiment of the present disclosure, the processor 121 is further configured to: when the test in the current round is terminated and all the testing processes pass the test, determine that the test in the current round is passed; and when the test in the current round is terminated and there are one or more testing processes which fail to pass the test, determine that the test in the current round is failed.

In a possible embodiment of the present disclosure, the processor 121 is further configured to: when the test in the current round is terminated and all the testing processes pass the test, output the testing result indicating that the to-be-tested object has passed the test; and when the test in the current round is terminated and there are one or more testing processes which fail to pass the test, output the testing result indicating that the to-be-tested object fails to pass the test.

In a possible embodiment of the present disclosure, the processor 121 is further configured to, when the test in the current round is terminated, output the testing value of each performance index obtained in the current round.

In a possible embodiment of the present disclosure, the processor 121 is further configured to: when the at least two testing processes are performed in parallel in each round, configure a second testing parameter for the to-be-tested object, set a performance index threshold corresponding to each testing process, and perform the at least two testing processes in parallel so as to obtain the testing value of the performance index for each testing process, a value of the second testing parameter being an initial value or a value adjusted after the test in the previous round is terminated; and determine whether each testing process passes the test in accordance with the testing value of the performance index obtained in each testing process and the performance index threshold.

In a possible embodiment of the present disclosure, the processor 121 is further configured to: terminate the test in the current round when any testing process in the current round fails to pass the test; and terminate the test in the current round when all the testing processes in the current round pass the test.

In a possible embodiment of the present disclosure, the processor 121 is further configured to: when the test in the current round is terminated and all the testing processes pass the test, determine that the test in the current round is passed; and when the test in the current round is terminated and there are one or more testing processes which fail to pass the test, determine that the test in the current round fails to be passed.

In a possible embodiment of the present disclosure, the processor 121 is further configured to output the testing value of each performance index obtained in the current round when the test in the current round is terminated.

In a possible embodiment of the present disclosure, the at least two testing processes include a first testing process and a second testing process, and there is an association relationship between a performance index measured in the first testing process and a performance index measured in the second testing process. The association relationship includes at least one of that the performance index measured in the first testing process is positively associated with the performance index measured in the second testing process, that the performance index measured in the first testing process is negatively associated with the performance index measured in the second testing process, or the performance index measured in the first testing process and the performance index measured in the second testing process are in a mutual cause-effect relation.

In a possible embodiment of the present disclosure, the processor 121 is further configured to: determine a target performance index in a target application scenario in accordance with a first mapping relationship between an application scenario and the performance index of the to-be-tested object; determine a target testing parameter corresponding to the target performance index in accordance with a second mapping relationship between the performance index and the testing parameter of the to-be-tested object; and generate the at least two testing processes for measuring the target performance index in accordance with the target testing parameter.

In a possible embodiment of the present disclosure, the processor 121 is further configured to: form a polygon with the performance index measured in each testing process as a vertex; take a line connecting a center and each vertex of the polygon as a scale line, and mark a numerical value of a corresponding performance index on the scale line; determine a corresponding threshold point on the scale line in accordance with a performance index threshold for each performance index, and connect the threshold points on the adjacent scale lines sequentially to generate a threshold region corresponding to the performance index threshold; determine a corresponding testing value point on the scale line in accordance with the testing value of the performance index for each testing process, and connect the testing value points on the adjacent scale lines sequentially to generate a testing value region corresponding to the testing value of the performance index; and obtain the testing result indicating whether the to-be-tested object has passed the test in accordance with whether the threshold region is included in the testing value region.

It should be appreciated that, the testing device in the embodiments of the present disclosure corresponds to the above-mentioned testing method in FIG. 8, so the implementation of the testing device may refer to that of the testing method with a same technical effect. It should be further appreciated that, the testing device in the embodiments of the present disclosure is used to implement the steps of the above-mentioned testing method with a same technical effect, which will not be particularly defined herein.

Figure 13:
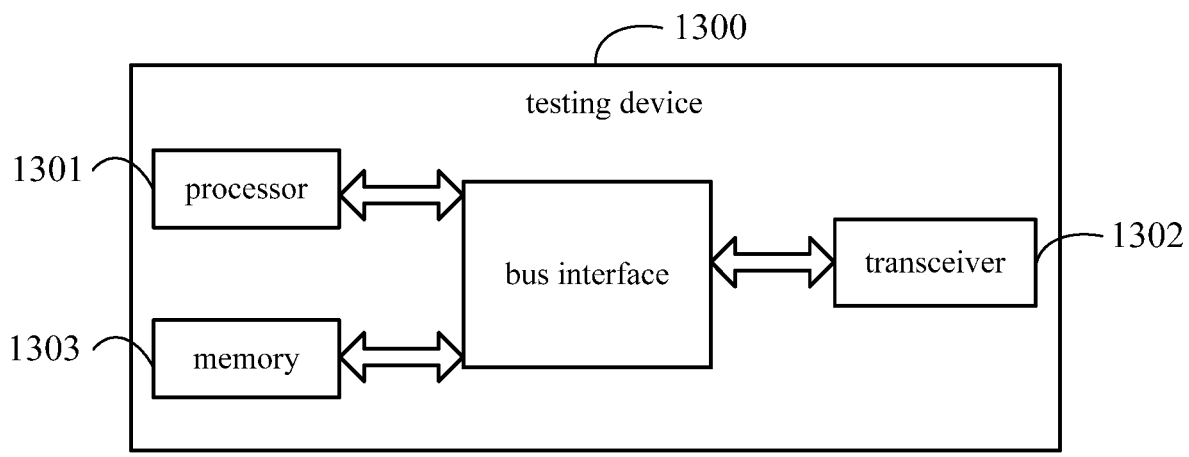
FIG. 13 is another schematic view showing the testing device according to one embodiment of the present disclosure.

As shown in FIG. 13, the present disclosure further provides in some embodiments a testing device 1300, which includes a processor 1301, a transceiver 1302, a memory 1303 and a bus interface.

In the embodiments of the present disclosure, the testing device 1300 further includes a program stored in the memory 1303 and executed by the processor 1301. The processor 1301 is configured to execute the program, so as to: configure one or more testing parameters for a to-be-tested object, and perform at least two testing processes to obtain a testing value of each performance index for each testing process, each of the at least two testing processes being used to test different performance index of the to-be-tested object or to test different performance indices of the to-be-tested object; and generate a testing result of the to-be-tested object in accordance with the testing value of each performance index for each testing process.

It should be appreciated that, in the embodiments of the present disclosure, the program is executed by the processor 1301 so as to implement the steps of the above-mentioned testing method in FIG. 8 with a same technical effect, which will not be particularly defined herein.

In FIG. 13, bus architecture may include a number of buses and bridges connected to each other, so as to connect various circuits for one or more processors 1301 and one or more memories 1303. In addition, as is known in the art, the bus architecture may be used to connect any other circuits, such as a circuit for a peripheral device, a circuit for a voltage stabilizer and a power management circuit. The bus interface may be provided, and the transceiver 1302 may consist of a plurality of elements, i.e., a transmitter and a receiver for communication with any other devices over a transmission medium.

The processor 1301 may take charge of managing the bus architecture as well as general processings. The memory 1303 may store therein data for the operation of the processor 1301.

It should be appreciated that, the testing device in the embodiments of the present disclosure corresponds to the above-mentioned testing method in FIG. 8, and the implementation of the testing device may refer to that of the testing method with a same technical effect. In the testing device, the transceiver 1302 is in communication with the memory 1303 and the processor 1301 via a bus interface. A function of the processor 1301 may also be implemented through the transceiver 1302, and a function of the transceiver 1302 may also be implemented through the processor 1301. It should be further appreciated that, the testing device in the embodiments of the present disclosure is used to implement the steps of the testing method with a same technical effect, which will not be particularly defined herein.

The present disclosure further provides in some embodiments a computer-readable storage medium storing therein a program. The program is executed by a processor so as to: configure one or more testing parameters for a to-be-tested object, and perform at least two testing processes to obtain a testing value of each performance index for each testing process, each of the at least two testing processes being used to test different performance index of the to-be-tested object or to test different performance indices of the to-be-tested object; and generate a testing result of the to-be-tested object in accordance with the testing value of each performance index for each testing process.

The program is executed by the processor so as to implement the above-mentioned testing method with a same technical effect, which will not be particularly defined herein.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A testing method, comprising:
    configuring one or more testing parameters for a to-be-tested object, and performing at least two testing processes to obtain testing value(s) of each of performance index(es) for each testing process, each of the at least two testing processes being used to test the performance index(es) of the to-be-tested object which is/are different from the other performance index(es) of the to-be-tested object being obtained by the other testing process(es); and
    generating a testing result of the to-be-tested object in accordance with the testing value(s) of each of the performance index(es) for each testing process,
    wherein the configuring the one or more testing parameters for the to-be-tested object and performing at least two testing processes to obtain the testing value(s) of each of the performance index(es) for each testing process comprises performing test for at least one round, and in each round, the one or more testing parameters are configured for the to-be-tested object and performance index threshold(s) is/are set,
    wherein the at least two testing processes are performed in parallel in each round,
    wherein when the at least two testing processes are performed in parallel in each round, the performing a current testing process comprises:
    configuring a second testing parameter for the to-be-tested object, setting performance index threshold(s) corresponding to each testing process, and performing the at least two testing processes in parallel so as to obtain the testing value(s) of each of the performance index(es) for each testing process, a value of the second testing parameter being an initial value or a value adjusted after the test in a previous round is terminated; and
    determining whether each testing process passes the test in accordance with the testing value(s) of each of the performance index(es) obtained in each testing process and the performance index threshold(s).

2. The testing method according to claim 1, wherein the generating the testing result of the to-be-tested object in accordance with the testing value(s) of each of the performance index(es) for each testing process comprises:
    terminating the test in the current round when any testing process in the current round fails to pass the test; or
    terminating the test in the current round when all the testing processes in the current round pass the test.

3. The testing method according to claim 2, wherein the generating the testing result of the to-be-tested object in accordance with the testing value(s) of each of the performance index(es) for each testing process comprises: when the test in the current round is terminated and all the testing processes pass the test, determining that the test in the current round passes; or, when the test in the current round is terminated and there are one or more testing processes which fail to pass the test, determining that the test in the current round fails; or wherein the generating the testing result of the to-be-tested object in accordance with the testing value(s) of each of the performance index(es) for each testing process further comprises: outputting the testing value(s) of each performance index(es) obtained in the current round, when the test in the current round is terminated.

4. The testing method according to claim 1, wherein the at least two testing processes comprise a first testing process and a second testing process, and there is an association relationship between a performance index measured in the first testing process and a performance index measured in the second testing process,
wherein the association relationship comprises at least one of: that the performance index measured in the first testing process is positively associated with the performance index measured in the second testing process, that the performance index measured in the first testing process is negatively associated with the performance index measured in the second testing process, or the performance index measured in the first testing process and the performance index measured in the second testing process are in a mutual cause-effect relation.

5. The testing method according to claim 1, further comprising:
determining a target performance index in a target application scenario in accordance with a first mapping relationship between an application scenario and the performance index(es) of the to-be-tested object;
determining a target testing parameter corresponding to the target performance index in accordance with a second mapping relationship between the performance index(es) and the one or more testing parameters of the to-be-tested object; and
generating the at least two testing processes for measuring the target performance index in accordance with the target testing parameter.

6. The testing method according to claim 1, wherein the generating the testing result of the to-be-tested object in accordance with the testing value(s) of each of the performance index(es) for each testing process comprises:
forming a polygon with the performance index measured in each testing process as a vertex;
taking a line connecting a center and each vertex of the polygon as a scale line, and marking a numerical value of a corresponding performance index on the scale line;
determining a corresponding threshold point on the scale line in accordance with performance index threshold(s) for each performance index, and connecting the threshold points on adjacent scale lines sequentially to generate a threshold region corresponding to the performance index threshold(s);
determining a corresponding testing value point on the scale line in accordance with the testing value(s) of each of the performance index(es) for each testing process, and connecting the testing value points on the adjacent scale lines sequentially to generate a testing value region corresponding to the testing value of the performance index; and
obtaining the testing result indicating whether the to-be-tested object has passed the test in accordance with whether the threshold region is comprised in the testing value region.

7. The testing method according to claim 6, wherein the obtaining the testing result indicating whether the to-be-tested object has passed the test in accordance with whether the threshold region is comprised in the testing value region comprises:
when an entire threshold region is comprised in the testing value region, obtaining the testing result indicating that the to-be-tested object has passed the test, otherwise obtaining the testing result indicating that the to-be-tested object fails to pass the test.

8. A testing device, comprising a transceiver and a processor, wherein the transceiver is configured to configure one or more testing parameters for a to-be-tested object,
wherein the processor is configured to:
perform at least two testing processes to obtain testing value(s) of each of the performance index(es) for each testing process, each of the at least two testing processes being used to test the performance index(es) of the to-be-tested object which is/are different from the other performance index(es) of the to-be-tested object being obtained by the other testing process(es)object; and
generate a testing result of the to-be-tested object in accordance with the testing value(s) of each of the performance index(es) for each testing process,
wherein the processor is further configured to perform test for at least one round, and in each round, the one or more testing parameters are configured for the to-be-tested object and performance index threshold(s) is/are set,
wherein the processor is further configured to perform the at least two testing processes in parallel in each round,
wherein when the at least two testing processes are performed in parallel in each round, the processor is further configured to:
configure a second testing parameter for the to-be-tested object, set performance index threshold(s) corresponding to each testing process, and perform the at least two testing processes in parallel so as to obtain the testing value(s) of each of the performance index(es) for each testing process, a value of the second testing parameter being an initial value or a value adjusted after the test in a previous round is terminated; and
determine whether each testing process passes the test in accordance with the testing value(s) of each of the performance index(es) obtained in each testing process and the performance index threshold(s).

9. The testing device according to claim 8, wherein with respect to the processor being configured to generate the testing result of the to-be-tested object in accordance with the testing value(s) of each of the performance index(es) for each testing process, the processor is configured to:
terminate the test in the current round when any testing process in the current round fails to pass the test; or terminate the test in the current round when all the testing processes in the current round pass the test.

10. The testing device according to claim 9, wherein with respect to the processor being configured to generate the testing result of the to-be-tested object in accordance with the testing value(s) of each of the performance index(es) for each testing process, the processor is configured to: when the test in the current round is terminated and all the testing processes pass the test, determine that the test in the current round passes; or,
when the test in the current round is terminated and there are one or more testing processes which fail to pass the test, determine that the test in the current round fails; or
wherein with respect to the processor being configured to generate the testing result of the to-be-tested object in accordance with the testing value(s) of each of the performance index(es) for each testing process, the processor is configured to: output the testing value(s) of each of the performance index(es) obtained in the current round when the test in the current round is terminated.

11. The testing device according to claim 8, wherein the at least two testing processes comprise a first testing process and a second testing process, and there is an association relationship between a performance index measured in the first testing process and a performance index measured in the second testing process, wherein the association relationship comprises at least one of: that the performance index measured in the first testing process is positively associated with the performance index measured in the second testing process, that the performance index measured in the first testing process is negatively associated with the performance index measured in the second testing process, or the performance index measured in the first testing process and the performance index measured in the second testing process are in a mutual cause-effect relation.

12. A testing method, comprising:

configuring one or more testing parameters for a to-be-tested object, and performing at least two testing processes to obtain testing value(s) of each of performance index(es) for each testing process, each of the at least two testing processes being used to test the performance index(es) of the to-be-tested object which is/are different from the other performance index(es) of the to-be-tested object being obtained by the other testing process(es); and generating a testing result of the to-be-tested object in accordance with the testing value(s) of each of the performance index(es) for each testing process, wherein the configuring the one or more testing parameters for the to-be-tested object and performing at least two testing processes to obtain the testing value(s) of each of the performance index(es) for each testing process comprises performing test for at least one round, and in each round, the one or more testing parameters are configured for the to-be-tested object and performance index threshold(s) is/are set, wherein the at least two testing processes are performed sequentially in each round, wherein when the at least two testing processes are performed sequentially in each round, the testing processes are performed sequentially in accordance with a predetermined order of the testing processes, wherein the performing a current testing process comprises:

configuring a first testing parameter for the to-be-tested object, setting first performance index threshold(s), and in a case that second performance index(es) meet second performance index threshold(s), performing the current testing process to obtain the testing value(s) of first performance index(es) for the current testing process; and determining whether the current testing process passes the test in accordance with the testing value(s) of the first performance index(es) and the first performance index threshold(s), wherein when the current testing process is not the first testing process in the current round, the first testing parameter is provided with a value so that the second performance index(es) meet the second performance index threshold(s) after a previous testing process is terminated, and the second performance index(es) is a set of performance indexes for all the testing processes before the current testing process in the current round.

13. The testing method according to claim 12, wherein when the current testing process is a first testing process in a current round, a value of the first testing parameter is an initial value or a value adjusted in accordance with a testing result of a previous round; or wherein the testing method further comprises: when the current testing process fails to pass the test, terminating the test in the current round; when the current testing process passes the test and the current testing process is a last testing process in the current round, terminating the test in the current round; and when the current testing process passes the test and the current testing process is not the last testing process in the current round, performing the test in a next testing process of the current testing process.

14. The testing method according to claim 2, wherein subsequent to terminating the test in the current round when the current testing process fails to pass the test, the value of the first testing parameter is adjusted in accordance with the testing result of the current round, and the testing process in a next round is performed; or wherein subsequent to terminating the test in the current round when the current testing process passes the test, whether to continue to perform the test in a next round and whether to configure or update the one or more testing parameters for the test in the next round are determined, and when the test in the next round is to be performed, the testing processes above are repeated in the next round.

15. The testing method according to claim 13, wherein the generating the testing result of the to-be-tested object in accordance with the testing value(s) of each of the performance index(es) for each testing process comprises:

when the test in the current round is terminated and all the testing processes pass the test, determining that the test in the current round passes; or when the test in the current round is terminated and there are one or more testing processes which fail to pass the test, determining that the test in the current round fails.

16. The testing method according to claim 15, wherein the generating the testing result of the to-be-tested object in accordance with the testing value(s) of each of the performance index(es) for each testing process further comprises: when the test in the current round is terminated and all the testing processes pass the test, outputting the testing result indicating that the to-be-tested object has passed the test; or, when the test in the current round is terminated and there are one or more testing processes which fail to pass the test, outputting the testing result indicating that the to-be-tested object fails to pass the test; or the generating the testing result of the to-be-tested object in accordance with the testing value(s) of each of the performance index(es) for each testing process further comprises, when the test in the current round is terminated, outputting the testing value(s) of each of the performance index(es) obtained in the current round.

17. The testing method according to claim 12, wherein the at least two testing processes comprise a first testing process and a second testing process, and there is an association relationship between a performance index measured in the first testing process and a performance index measured in the second testing process, wherein the association relationship comprises at least one of: that the performance index measured in the first testing process is positively associated with the performance index measured in the second testing process, that the performance index measured in the first testing process is negatively associated with the performance index measured in the second testing process, or the performance index measured in the first testing process and the performance index measured in the second testing process are in a mutual cause-effect relation.

18. The testing method according to claim 12, further comprising:
   determining a target performance index in a target application scenario in accordance with a first mapping relationship between an application scenario and the performance index(es) of the to-be-tested object;
   determining a target testing parameter corresponding to the target performance index in accordance with a second mapping relationship between the performance index(es) and the testing parameter of the to-be-tested object; and
   generating the at least two testing processes for measuring the target performance index in accordance with the target testing parameter.

19. The testing method according to claim 12, wherein the generating the testing result of the to-be-tested object in accordance with the testing value(s) of each of the performance index(es) for each testing process comprises:
   forming a polygon with the performance index measured in each testing process as a vertex;
   taking a line connecting a center and each vertex of the polygon as a scale line, and marking a numerical value of a corresponding performance index on the scale line;
   determining a corresponding threshold point on the scale line in accordance with a performance index threshold for each performance index, and connecting the threshold points on adjacent scale lines sequentially to generate a threshold region corresponding to the performance index threshold;
   determining a corresponding testing value point on the scale line in accordance with the testing value(s) of the each of the performance index(es) for each testing process, and connecting the testing value points on the adjacent scale lines sequentially to generate a testing value region corresponding to the testing value(s) of each of the performance index(es); and
   obtaining the testing result indicating whether the to-be-tested object has passed the test in accordance with whether the threshold region is comprised in the testing value region.

20. The testing method according to claim 19, wherein the obtaining the testing result indicating whether the to-be-tested object has passed the test in accordance with whether the threshold region is comprised in the testing value region comprises:
   when an entire threshold region is comprised in the testing value region, obtaining the testing result indicating that the to-be-tested object has passed the test, otherwise obtaining the testing result indicating that the to-be-tested object fails to pass the test.

* * * * *